(12) United States Patent
Keeler

(10) Patent No.: US 6,406,355 B1
(45) Date of Patent: Jun. 18, 2002

(54) SURFACE MODIFYING PROCESS

(75) Inventor: Anthony H. Keeler, Knowlton (CA)

(73) Assignee: Bondface Technology Inc., Lac Brome (CA)

( * ) Notice: Subject to any disclaimer, the term of this patent is extended or adjusted under 35 U.S.C. 154(b) by 0 days.

(21) Appl. No.: 09/463,290

(22) PCT Filed: Jul. 23, 1998

(86) PCT No.: PCT/CA99/00713

§ 371 (c)(1),
(2), (4) Date: Jan. 24, 2000

(87) PCT Pub. No.: WO99/04929

PCT Pub. Date: Feb. 4, 1999

(30) Foreign Application Priority Data

Jul. 24, 1997 (GB) ............................................. 9715597

(51) Int. Cl.$^7$ ................................................. B24B 1/00
(52) U.S. Cl. ......................................... 451/28; 451/296
(58) Field of Search .............................. 451/28, 25, 49, 451/317, 304, 307, 296, 50, 51, 302, 303, 168, 170, 173; 29/888.75, 888.76

(56) References Cited

U.S. PATENT DOCUMENTS 5,095,663 A * 3/1992 Judge et al. .................. 451/49
5,437,125 A * 8/1995 Barton, II .................... 451/49
5,775,978 A * 7/1998 Brocksieper et al. ......... 451/49
6,004,189 A * 12/1999 Phillips ....................... 451/49

* cited by examiner

Primary Examiner—Derris H. Banks
(74) Attorney, Agent, or Firm—Ridout & Maybee

(57) ABSTRACT

A method of preparing a surface of a workpiece of solid ductile material to provide a transition zone between that material and a different material to be brought into intimate contact with the first material, involves relatively moving the workpiece surface and a substrate to which are bonded adhesive particles much harder than the ductile material through a contact zone while pressing the particles of abrasive into the material surface, such that the abrasive particles score recesses extending longitudinally of the material surface while displacing said ductile material from the scores to form processes integral with the material and extending outwardly from the surface and parallel to the second recesses into spaces between the material surface and the substrate, the recesses and processes together providing at the prepared surface a transition zone between the ductile material and the different material.

6 Claims, 1 Drawing Sheet

SURFACE MODIFYING PROCESS

This invention relates to the surface treatment of a body of material presenting a planar surface to modify said surface to produce an interface layer of finite depth which provides for entry of another material into the interface layer and within which interface layer material extends from said body and presents an extended surface area.

In the context of this specification, 'planar' refers to the local character of the surface, and does not exclude for example surfaces which are smoothly curved or cylindrical.

In Canadian Patent No. 1,330,521, issued Jul. 5, 1994 and assigned to the present applicant, there is described a surface treatment applicable to freely machinable material in which a pattern of planing cuts is applied to the surface of a material to provide an array of retroverted non-detached shavings or burrs which provide such a layer. This layer can be penetrated by another layer, for example a fluid which may be liquid (for example a melted or curable material which thereafter solidifies) or gaseous, or another similar formed surface layer on another body of material. Formation of such a layer requires repeated reciprocatory applications of a cutting edge of an appropriately formed tool or tools, which means that provision must be made for maintaining the cutting edges of the tools, and severely limits production speeds unless the number of cutting edges is very large.

It is an object of the present invention to provide an alternative method of producing such an interface layer, and to provide materials having such an interface layer of different configuration.

According to the invention there is provided a method for preparing a surface of a workpiece of solid ductile material to provide a transition zone between that material and a different material to be brought into intimate contact with the first material, comprising relatively moving a contact zone between said material surface and a substrate to which are bonded adhesive particles much harder than said material while pressing said particles of abrasive into said material surface, such that the abrasive particles score recesses extending longitudinally in said material surface while displacing said ductile material from the scores into processes integral with said material and extending outwardly from said surface and parallel to said scored recesses into spaces between the material surface and the substrate, said recesses and processes together providing a transition zone between said ductile material and the different material.

Typically, the substrate is a belt or drum, and the size of the particles, their distribution on the substrate, and the relative speed of the material surface and the substrate, are selected so as to avoid substantial stripping of the processes from the surface by the abrasive particles. Greater irregularity of the processes may be obtained by varying the relative speed of the material and the substrate during operation, and/or varying the spacing between the material surface and the substrate. The depth of the interface layer from the bottom of the scores to the outer extremities of the processes may be further controlled by lightly rolling or brushing the treated surface of the material. Preferably the spacing between the material and the substrate in the contact pressure zone at least equals the depth of penetration of the material.

The method of the invention is further described with reference to the accompanying drawings, in which.

Figure 1:
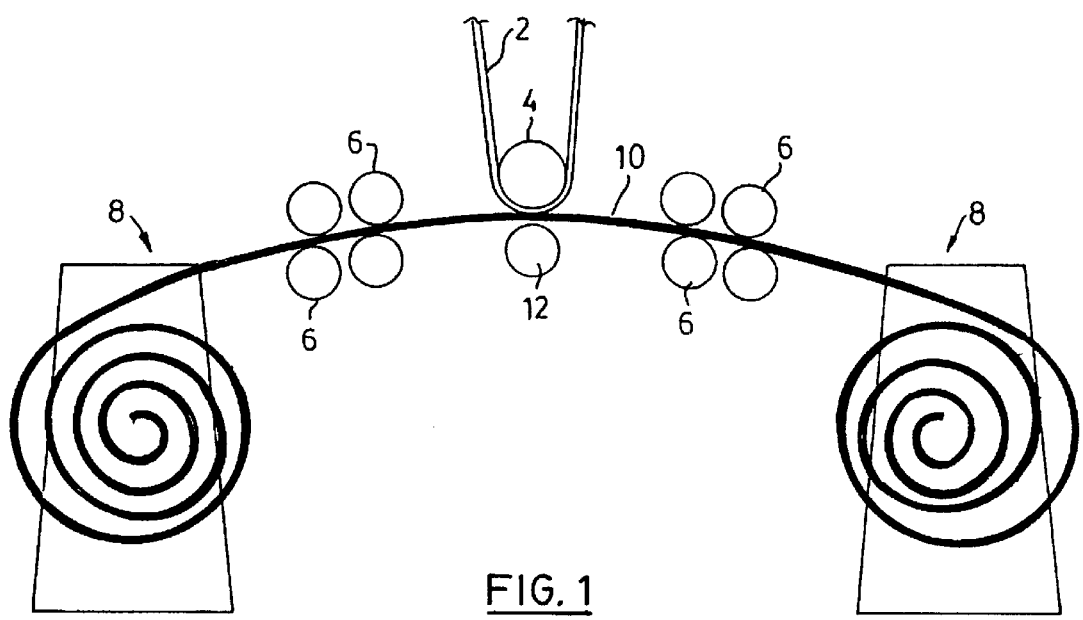
FIG. 1 is a diagrammatic longitudinal section through a belt sanding machine that could be used to implement the invention.
Figure 2:
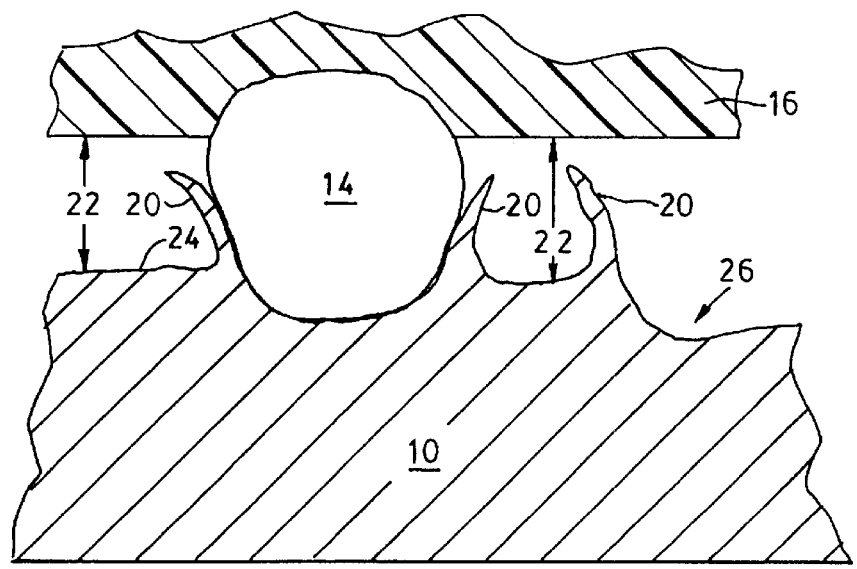
FIG. 2 is a fragmentary transverse section through a workpiece and an abrasive belt illustrating the operation of the invention.

Sanding machines using abrasive belts, drums or other abrasive carriers in which abrasive particles are bonded to a substrate, are well known for treating workpieces to remove surface imperfections and provide surfaces of predetermined characteristics. The action of such a machine is to remove material from the surface of the workpiece to a controlled depth, the abrasive particles bonded to the carrier cutting into the surface of the workpiece and carrying away the displaced material. Thus referring to FIG. 1, an abrasive belt 2 is driven over a roller 4 which forms a platen or a flat platen with edge rollers, so that the belt moves across the surface of a workpiece 10 supported by a billy roll 12 forming a second platen, or another flat platen with edge rollers. The workpiece 10 is drawn through a zone between the rolls 4 and 12 at a controlled speed velocity by pinch rolls 6, this velocity being different from, and typically much less than the linear velocity of the belt 2 so that the abrasive particles on the latter strip material from the workpiece to a depth controlled by the spacing between the platens, which is adjustable. In a drum sander, the abrasive carrier is supported directly on a drum which forms the first platen. If the workpiece is a continuous strip, stands supporting supply and take up rolls and 18 may be provided.

Operation according to the present invention, while using similar apparatus, is rather different, the objective being to redistribute the material of the surface of the workpiece rather than remove it. Accordingly, the platens are adjusted so that, in the pressure zone between them, only the furthest projecting portions of particles 14 of abrasive bonded to the belt 2 are pressed into the surface of the workpiece 10, a substantial clearance space being maintained between the surface of the workpiece and the substrate formed by the bonding or backing layer 16 onto which the abrasive particles are bonded. If the material of the workpiece is sufficiently ductile, an abrasive particle cutting into and moving linearly across the material surface (it is assumed that the abrasive particles are much harder than the workpiece material) will produce 'bow waves' of displaced material which will be displaced laterally and outwardly from the surface of the workpiece to form processes 20 extending into the clearance space 22 between the workpiece surface 24 and the layer 16. The distribution and size of abrasive particles on the band, the length of the contact pressure zone between the particles on the belt and the workpiece, and the relative velocities of the belt and the workpiece are selected so that a substantial portion of the workpiece surface, after treatment, is covered with recesses 26 in the form of elongated scores produced by, the abrasive particles, and processes 20 in the form of the 'bow waves' produced by material displaced from the scores but still integral with the workpiece, without too many of the processes having been cut away by subsequent passes of further abrasive particles. In order to avoid excessive linearity of the processes, oscillation of one or other platen, to vary the clearance between the workpiece and the belt, or variation of their relative speed, may be used to produce irregularities along the length of the processes.

Similar considerations apply when the adhesive particles are applied to a drum or roller, except that the contact 'footprint' will be much shorter, and accordingly much shorter scores can be produced by relative motion between the drum and the workpiece, producing a broken pattern of processes without the need for speed or clearance oscillation.

In every case the belt or drum should be designed so that the adhesive particles can cut into the workpiece while leaving sufficient clearance for the displaced material between the, workpiece surface and the backing layer of the belt or drum. Typically, rather coarse abrasive grits should be utilized, for example about 1 mm particle size, and the grit should be bonded to the substrate so that the particles project from it by at least double the intended cutting depth. For example, the bonding depth might be 0.4 mm and the cutting depth 0.2 mm, leaving a 0.4 mm space for formation of the processes.

Provision must be made to support and drive the workpiece, which may often be of thin sheet material, through the contact pressure zone without the workpiece becoming distorted, and without the processes produced becoming flattened. In the case of thin sheets, these will usually need to be maintained under tension through the pressure zone which implies some form of edge drive downstream or laterally adjacent the pressure zone if damage to the processes is to be avoided. It may be desirable however in some instances to apply light rolling or brushing to the processes produced in order to improve their configuration, or they may be rolled with a laterally ribbed or otherwise patterned roller in order to scallop or interrupt lengthy longitudinal processes.

The material of the workpiece must be sufficiently ductile that its material can be displaced by the abrasive particles without being severed. While the workpiece will commonly be formed of a ductile metal, some synthetic resins and synthetic resin composites also possess adequate ductility to be processed by the method of the invention. The suitability of a material may readily be determined empirically. Abrasive particles should be selected for adequate hardness and durability and should be adherent with respect to the workpiece material. Typical abrasive grits such as diamond, silicon carbide, fused alumina, garnet or boron nitride may be utilized. The particles must of course be securely bonded to the substrate layer.

Suitable particle spacing on the substrate layer may be obtained by various means. This spacing will typically be greater than that in convention abrasive materials so as to avoid excessive stripping of the processes formed. Thus abrasive particles may be applied sparsely to an adhesive layer on the substrate, or may be applied using a predetermined geometry using, for example, a perforated screen. Alternatively again, particles may be selectively removed from a bonding layer to obtain a desired sparsity. The character of the processes and recesses may be controlled by selecting the abrasive particle size and the degree of projection of the particles beyond a layer bonding them to the substrate, and their spacing by the sparsity of the particles and the distance for which each particle is tangent to the surface during operation, which in turn depends on the length of the contact zone and the relative velocity of the particles and the workpiece.

A primary object of treating workpieces by the process of the invention is to displace material at the surface of the workpiece so as to distribute it into an interface zone between the material of the workpiece and an adjacent material requiring intimate contact with the workpiece material. The adjacent material may be a liquid, a material which is initially liquid but sets or cures so as to bond to or harden against the workpiece, or a paste composition such as need in many electrochemical cells, in which a maximum area of electrical contact and a good mechanical bond to the paste is desired, or a liquid and/or gaseous layer requiring intimate contact with an electrode in an electrochemical cell. The extended surface of the workpiece may also provide a substrate for a layer of catalyst applied thereto.

A particular application of the invention is in processing the surface of materials forming electrodes in electrochemical cells so as to provide processes from the electrode surface into an interface layer with another component of the cell, such component being either a liquid electrolyte, a gas electrolyte, or a solid electrolyte such as manganese dioxide in primary cells or the paste in a lead acid secondary cell. In each case the effective surface area of the electrode is increased, and in the case of an interface with solid material, mechanical contact and bonding is improved. The processes also can form a vehicle for carrying a catalyst layer, for example in fuel cells. The interface layer may also provide a passage for liquid or gas between the processed surface of an electrode and an adjacent structure such as a semipermeable membrane.

I claim:

1. A method for preparing a surface of a workpiece in the form of a sheet of a solid ductile first material to provide a transition zone between said first material and a second material to be brought into intimate contact with said first material, comprising:

moving said first material relative to a moving belt or drum to the surface of which are bonded abrasive particles much harder than said first material through a contact zone while pressing said particles of abrasive into said ductile material surface, such that the abrasive particles score recesses extending longitudinally of said first material surface while displacing said ductile material from the scores to form processes integral with said material and extending outwardly from said surface and parallel to said scored recesses into spaces between the first material surface and the surface of said moving belt or drum, the distribution of the abrasive particles on the belt or drum being sufficiently sparse, and the contact duration and pressure between the belt or drum and the sheet being sufficiently restricted that a substantial proportion of the processes remain attached to the sheet, said recesses and process together providing the prepared surface with a transition zone between said ductile material and said second material.

2. A method according to claim 1, wherein the ductile material is in the form of a thin sheet and is maintained under tension through the contact zone.

3. A method according to claim 1 or claim 2, wherein the speed of relative movement, and/or the pressure applied between the material surface and the tooling surface is cyclically varied to produce variation in the profile of the processes.

4. A method according any of claims 1 or 2, wherein the workpiece is an electrode of an electrochemical cell.

5. A workpiece having a surface prepared by the method of any of claims 1 or 2.

6. An electrochemical cell including an electrode which is formed from a workpiece according to claim 5.

* * * * *